United States Patent [19]

Vicik

[11] Patent Number: 4,734,327
[45] Date of Patent: Mar. 29, 1988

[54] COOK-IN SHRINK FILM

[75] Inventor: Stephen J. Vicik, Darien, Ill.

[73] Assignee: Viskase Corporation, Chicago, Ill.

[21] Appl. No.: 946,722

[22] Filed: Dec. 29, 1986

[51] Int. Cl.$^4$ .................. B23B 27/08; B23B 27/16
[52] U.S. Cl. .................. 428/332; 428/474.4;
428/474.7; 428/515; 428/516
[58] Field of Search .......... 428/35, 474.5, 474.7,
428/575, 576, 332

[56] References Cited

U.S. PATENT DOCUMENTS

| | | |
|---|---|---|
| 4,095,012 | 8/1975 | Shirmer . |
| 4,104,404 | 3/1975 | Bieler et al. . |
| 4,197,326 | 8/1978 | Wakamatsu et al. . |
| 4,469,742 | 1/1983 | Oberle et al. . |
| 4,610,914 | 9/1986 | Newsome .................. 428/516 |
| 4,612,221 | 9/1986 | Biel et al. .................. 428/516 |
| 4,647,483 | 3/1987 | Tse et al. .................. 428/516 |
| 4,687,688 | 8/1987 | Curie et al. .................. 428/516 |

Primary Examiner—Paul J. Thibodeau
Attorney, Agent, or Firm—John C. LeFever

[57] ABSTRACT

An irradiated three layer heat shrinkable plastic film comprising an EVOH - Nylon core layer as an oxygen barrier, a first outer layer comprising a blend of EVA and C6-C8 olefin type LLDPE, and a second outer layer comprising EVA.

20 Claims, No Drawings

COOK-IN SHRINK FILM

BACKGROUND OF THE INVENTION

This invention relates generally to heat shrinkable, relatively gas impermeable thermoplastic film which can be heat sealed to itself to form a flexible package. More particularly, it relates to a multilayer plastic film which can be used in the form of a hermetically sealed bag for packaging food products wherein the packaged product is submerged in heated water for cooking. Under these conditions the bag film is shrinkable and retains its integrity.

There are numerous requirements for a cook-in shrink film including: delamination resistance, low oxygen permeability, heat shrinkability representing about 30–50% biaxial shrinkage at about 90° C., and optical clarity.

The prior art has developed a number of multilayer plastic cook-in films and certain of these are in commercial use. For example Bieler et al U.S. Pat. No. 4,104,404 describes a ten layer film comprising four central Nylon layers, an ionomer layer on each outer side of the central layers, and two outer polyethylene layers on each outer side of the ionomer layers. The patentee demonstrates that delamination of the outer polyethylene layer under cook-in conditions was only avoided by irradiation dosage of the entire multilayer film at a level of at least 6 MR.

Another commercially employed cook-in film is the type described in Oberle et al U.S. Pat. No. 4,469,742, also comprising six layers irradiated to dosage of at least 6 MR. The central barrier layer is hydrolyzed ethylene-vinyl acetate copolymer (EVOH), chosen because of its higher softening point and superior oxygen barrier properties as compared to the saran-type barrier layer commonly used in multilayer films for ambient temperature applications. On each side of the barrier layer is an adhesive layer such as chemically modified polyethylene, eg. Plexar. On the outer side of each adhesive layer is a shrink layer such as ethylene-vinyl acetate copolymer (EVA), and the outside (abuse) layer is also the EVA type having a vinyl acetate content of about 5–12 wt. %. The innermost (heat sealing) layer may for example be a propylene-ethylene random copolymer (PER).

One general concern in the extrusion manufacture of multilayer films containing EVOH is that the process conditions be such that gel formation is avoided. This may occur if resins are retained in the extruder passages and exposed to heat for prolonged periods so as to form oxidized particles which ultimately cause bubble breakage or appear in the finished film.

It will be apparent from the foregoing that these prior art cook-in films are complex both in terms of multiple materials and sophisticated manufacturing techniques ie. six layers and relatively high irradiation dosage level to avoid delamination.

A possible solution to the foregoing problems is a three layer film with EVOH as the barrier layer, but tests have shown that such prior art three layer films either would not biorient, or produce gel problems in the extrusion system, or have poor optical properties or have unacceptably low shrink value for cook-in applications, or a combination of these problems. By way of illustration, the addition of an adhesive to overcome a film delamination problem can result in an unacceptable increase in haze value.

An object of this invention is to provide an improved cook-in type multilayer plastic film which has less than six layers.

Another object is to provide a three layer cook-in plastic film which is relatively easy to process, ie. does not gel and may be readily bioriented.

Still another object is to provide a three layer cook-in type film having high shrink, good optical properties and good layer adhesion.

A further object of this invention is to provide such a three layer cook-in type film which does not require additives such as processing aids and does not require high irradiation dosage levels on the order of 6 MR to realize high strength.

Other objects and advantages will be apparent from the ensuing disclosure and appended claims.

SUMMARY OF THE INVENTION

In its broadest aspect, the invention is a three layer plastic film having: (a) a core layer of between about 60 and 90 weight percent hydrolyzed ethylene-vinyl acetate copolymer containing between about 28 and 40 weight percent ethylene, being blended with between about 10 and 40 weight percent amide polymer having a melting point below about 420° F., the core layer providing an oxygen transmission rate below about 90 cc/$M^2$/mil thickness/24 hours/Atm. The latter rate is measured in accordance with the procedure outlined in ASTM 3985-81.

This film also has a first outer layer directly adhered to one side of the core layer comprising a blend of ethylene vinyl acetate containing between about 7 and 15 weight percent vinyl acetate, and between about 10 and 25 weight percent linear low density polyethylene being a copolymer of a C6 to C8 olefin and ethylene. Further, the film has a second outer layer directly adhered to the other side of the core layer and comprising ethylene vinyl acetate containing between about 7 and 15 weight percent vinyl acetate. The film is irradiated at a level of between about 1 and 5 MR.

As will be demonstrated hereafter, this film is relatively easy to process, ie. may be readily oriented, is not delaminated under cook-in conditions, has good optical properties and affords the desired high shrink value of prior art six layer cook-in films. Moreover it is easier to manufacture because of the fewer number of layers and lower irradiation dosage level. This advance in the cook-in film art is verified by applicants' belief that based on presently available information, the prior art has not disclosed an EVOH-type barrier layer cook-in film meeting commercial requirements with only three layers.

In a preferred embodiment wherein gel formation in the extrusion system is to be avoided, the second outer layer is a blend of the aforementioned ethylene vinyl acetate and up to about 10 weight percent linear low density polyethylene being a copolymer of hexene-1 and ethylene.

DEFINITIONS

As used herein, the terms set forth below will be understood to have the following meanings:

"Polymer" includes homopolymers, copolymers, terpolymers and block, graft or random polymers.

"Amide" or "amide polymer" means a Nylon including polycaproamide, poly(hexamethylene, adipamide), polyhexamethylene sebacamide, polycaprylamide, polyundecanoamide, and polylauryllactum. These Nylons are respectively normally known as Nylon 6; Nylon 6,6; Nylon 6,10; Nylon 6,12; Nylon 8; Nylon 11; and Nylon 12. The preferred amide polymer in the film of this invention is Nylon 6,66 (Chemical Abstract Service Number 24993-04-02).

"Hydrolyzed ethylene-vinyl acetate" or "EVOH" means a hydrolyzed ethylene-vinyl acetate copolymer, preferably hydrolyzed to at least about 50%, most preferably to greater than about 99%. These compositions are also referred to as ethylene-vinyl alcohols and are ordinarily prepared by saponification, so are sometimes called "saponified ethylene-vinyl acetate copolymers".

"Cook-in" refers to packaging material structurally capable of withstanding exposure to long and slow cooking conditions while containing a food product, for example submersion in water at 70°-80° C. for 4-6 hours. Cook-in packaged food are essentially pre-packaged, pre-cooked foods which are directly transferred to the consumer in this form. These types of foods may be consumed with or without warming. Cook-in packaging materials maintain seal integrity and in the case of multilayer films, are delamination resistant. Cook-in films must also be heat shrinkable under cook-in conditions so as to form a tightly fitting package. Preferably they also have a tendency for adhesion to the food product, thereby preventing "cook-out", which is the collection of juices between the outer surface of the food product and the inner surface of the film.

"Linear low density polyethylene" or "LLDPE" means copolymers of ethylene and certain other heavier olefins as for example butene, hexene and octene, having a density of at least about 0.91 gm/cm$^3$ and below about 0.94 gm/cm$^3$.

"Irradiation" means exposure to high energy radiation such as electrons, X-rays, gamma rays, beta rays and the like, which induce cross-linking between the molecules of the irradiated material. Preferably, irradiation is carried out by an electron accelerator and the dosage level is determined by standard dosimetry methods. The dosage is measured in "rads" wherein one rad is the absorbed dose of ionizing radiation equal to an energy of 100 ergs per gram of irradiation material. A megarad (MR) is one million rads.

DETAILED DESCRIPTION

With respect to the core layer, the amide polymer performs a plasticizing function for the hydrolyzed ethylene vinyl acetate copolymer (EVOH) which is the oxygen barrier component. The amide polymer must comprise at least 10 wt. % of the amide polymer-EVOH blend for processing, i.e., stretchability, into a biaxially oriented film. On the other hand, to retain the oxygen barrier performance the amide polymer should not comprise more than about 40 wt. % of the blend. As a preferred balance of these characteristics, the core layer comprises between about 75 and 85 wt. % hydrolyzed ethylene-vinyl acetate copolymer blended with between about 15 and 25 wt. % amide polymer.

The EVOH contains at least 28 wt. % ethylene to achieve the desired film shrinkage and stretching characteristics, and less than about 40 wt.% ethylene to achieve bubble integrity at the required stretch conditions. As a preferred balance of these characteristics, the hydrolyzed ethylene-vinyl acetate copolymer contains between about 32 and 38 wt. % ethylene.

The melting point of the amide polymer is below about 420° F. for compatability with the EVOH copolymer which typically melts between about 345° and 365° F. Higher melting amide polymers are not suitable because of the presence of gels and melted particles in the final film extruded at temperatures suitable for EVOH without degradation.

The core layer constituents are provided in proportions and quantities such than the oxygen transmission rate through the entire multilayer film is below about 90 cc/M$^2$/mil thickness/24 hrs./Atm. This is necessary to avoid spoilage of the food enclosed in the cook-in film due to oxygen passage from the environment through the film wall. The core layer thickness is preferably up to about 0.3 mils to perform its intended function. Thicker core layer do not appreciably improve performance for the cook-in application. The core layer is most preferably between about 0.05 and 0.2 mils thick to perform its intended function and provide maximum flexibility.

The first outer layer of this multilayer film is directly adhered to one side of the core layer, and in direct contact with the outer surface of the stored food product. This layer is primarily responsible for processability of this film, for example affording the needed stretchability for biaxial orientation. The first outer layer is also responsible for minimizing gel formation in the coextrusion system to form and orient the film. This layer comprises a blend of EVA containing between about 7 and 15 wt. % vinyl acetate, and between about 10 and 25 wt. % LLDPE, the latter being a copolymer of hexene-1 and ethylene. The vinyl acetate content should be at least 7 wt. % of the EVA to provide the desired high shrink, but no higher than about 15 wt. % to allow the needed biaxial orientation. Higher vinyl acetate content makes the film excessively soft and not capable of biaxial orientation. A preferred balance between these characteristics is a vinyl acetate content of between about 9 and 12 wt. % of the ethylene vinyl acetate.

The LLDPE content of the first outer layer is at least about 10 wt. % to permit the needed processability, and not more than about 25 wt. % to retain the desired good optical properties. These comprise a high gloss of at least 60% and low haze of below about 12%. As a preferred balance of these characteristics, the first outer layer contains between about 15 and 20 wt. % LLDPE. The only type of linear low density polyethylene which affords these desirable optical properties is an ethylene and C6 to C8 olefin copolymer. Suitable olefins include hexene-1 and octene-1. It has been discovered that the lower molecular weight olefin eg. butene type of LLDPE copolymers produce films with relatively low gloss and relatively high haze, and are unsatisfactory for manufacture of the multilayer film of this invention.

The thickness of the first outer layer is preferably between about 1.2 and 2.6 mils. Thinner layers may not perform the aforedescribed function while thicker layers do not appreciably improve processability of the film and may reduce total film performance.

The second outer layer of this film is directly adhered to the outer side of the core layer (opposite to the first outer layer), and comprises EVA containing between about 7 and 15 wt. % vinyl acetate. This layer is in direct contact with the environment including the heating liquid during cook-in. Since it is seen by the user/consumer, it must enhance optical properties of the film. Also, it must withstand contact with sharp objects so is termed the abuse layer and provides abrasion resistance. As with the first outer layer, the vinyl acetate content should be at least 7 wt. % of the EVA to provide the desired high shrink, but no higher than about 15 wt. % to allow the needed biaxial orientation. A preferred balance between these characteristics is a vinyl acetate content of between about 9 and 12 wt. % of the ethylene vinyl acetate.

The second outer layer thickness is preferably between about 0.3 and 1.0 mils. Thinner layers may be less effective in performing the abuse resistance protection, while thicker layers may not improve performance in this respect and may reduce film stretchability.

If gel formation is not a problem, no LLDPE is required, but if this is a concern the second outer layer should be a blend of EVA and up to about 10 wt. % LLDPE in the form of a copolymer of C6 to C8 olefin and ethylene. The LLDPE content should not exceed this level so as to maintain the desired optical properties, as previously discussed. The LLDPE content is preferably up to about 5 wt. % as a balance between good optical properties and avoidance of gel formation.

The multiple layer film of this invention is irradiated at a level of between about 1 and 5 MR to increase its layer adhesion and strength at cook-in conditions. Lower irradiation levels do not provide improved strength and higher levels tend to degrade the elongation properties of the film. A preferred balance is between about 2 and 4 MR. Irradiation may be performed prior to biaxial orientation but is preferably done after this step on the stretched and thinner film.

The thickness of the aforedescribed three layer film is preferably between about 2.0 and 3.5 mils. Lower thicknesses reduce the effectiveness of at least one of the three layers to perform the aforedescribed functions, while higher thicknesses reduce the film flexibility and do not appreciably improve its performance.

In general, various conventional additives such as slip agents and pigments can be incorporated in the film in accordance with conventional practice.

While this invention is specifically described in terms of three layers, it should be understood that one or more additional layers may be directly adhered to the outside of either the first outer layer or the second outer layer, but not between these layers and the core layer. For example, for improved meat adhesion certain ionomers may be added as a fourth layer to the first outer layer. The metal salt of an ethylene/organic acid copolymer sold by the DuPont Company under the product designation Surlyn 1650 is suitable for this purpose.

The multilayer film of this invention is preferably manufactured in tubular form by simultaneous coextrusion of the three layers using the conventional double bubble technique. This primary tube is biaxially oriented by stretching with internal pressure in the transverse direction and with the use of pinch rolls at different speeds in the machine direction. Then the bubble is collapsed. After cooling, the biaxially oriented tube is flattened and guided through an ionizing radiation field at a dosage of between about 1 and 5 MR.

The stretch ratio in the biaxial orientation is preferably sufficient to provide a multilayer film with total thickness of between about 2.0 and 3.5 mils. A stretch ratio of about 8-15:1 will impart a shrink capacity of about 30-35% biaxial free shrinkage at 90° C. (based on ASTM D2732).

The multilayer film is wound up as flattened, seamless, tubular film to be used later to make bags. This may be accomplished by end seals, typically made by clips or by transverse heat sealing across the width of flattened tubing followed by severing the tubing so that the transverse seal forms the bag bottom. Alternatively side-seal bags may be formed in which the transverse seals form the bag sides and one edge of the tubing forms the bag bottom.

Cook-in bags are used by placing the food product in the bag, evacuating the bag and sealing the open portion as by clipping. The evacuated product-containing bag is then immersed in a hot liquid bath typically at about 150° to 190° F., to uniformly shrink the film against the product outer surface.

EXAMPLE 1

In this example an embodiment of the three layer film of this invention was compared with a six layer commercially available cook-in film of the general type described in the aforementioned U.S. Pat. No. 4,469,742.

The inventive embodiment (sample 1) was prepared by simultaneous coextrusion of three layers to form a film including a 0.1 mil thick core layer of 80 wt. % hydrolyzed ethylene-vinyl acetate copolymer containing 38 wt. % ethylene, blended with 20 wt. % Nylon 6,66 copolymer. This particular amide polymer has a melting point of about 405° F. The oxygen transmission rate of this core layer was about 40 cc/M$^2$/mil thickness/24 hrs/Atm. The first outer layer of sample 1 comprised a blend of 80 wt. % ethylene vinyl acetate containing about 12 wt. % vinyl acetate, and 20 wt. % LLDPE (copolymer of hexene 1 and ethylene) obtained from Union Carbide Coporation as their product designation 7028 with density of about 0.918. The first outer layer thickness was 1.75 mils. The second outer layer of sample 1 comprised a blend of 95 wt. % ethylene vinyl acetate and 5 wt. % of the aforementioned LLDPE product designation 7028. The total film thickness was about 2.5 mils.

The prior art apparently six layer cook-in film (sample 2) had a thickness of about 3 mils, was manufactured by W R Grace Company's Cryovac Division and sold with a product designation CN-510.

Samples 1 and 2 were tested for optical properties, % shrink, and seal strength measured at 90° C. (194° F.) (a commercially acceptable criteria), the results being summarized in Table A.

TABLE A

| Film Sample No. | Haze % | Gloss (45°) % | % Shrink MD/TD | Secant Modulus PSI | Seal |
| --- | --- | --- | --- | --- | --- |
| 1 | 8.6 | 60 | 35/41 | 27 M | Good |
| 2 | 15 | 50 | 32/43 | 20 M | Good |

Table A demonstrates that the optical, strength and seal properties of the three layer inventive film are at least equivalent to a prior art commercially employed cook-in film appearing to have six layers.

EXAMPLE 2

In this example, the aforedescribed inventive sample I was compared with EVOH-type core layer films wherein the first outer layer was either 100% EVA or 100% LLDPE of the butene-1 copolymer type. Sample 3 comprised a 100% EVOH (32 wt. % ethylene) core layer, a 100% ethylene vinyl acetate (12 wt. % vinyl acetate) first outer layer, and a 100% ethylene vinyl acetate (12 wt. % vinyl acetate) second outer layer. Sample 4, a film 1.9 mils thick, comprised a 70 wt. % ethylene vinyl acetate (32 wt. % ethylene) and 30 wt. % Nylon 6,66 blend as the core layer, a 100% LLDPE of the butene-1 and ethylene copolymer type as the first outer layer, and a 100% ethylene vinyl acetate (12 wt. % vinyl acetate) second outer layer.

It was discovered that sample 3 could not be bioriented and that sample 4 had unacceptably low shrink values of 14% MD and 22% TD. Based on a comparison with sample 1, it is apparent that the first outer layer must comprise a blend of ethylene vinyl acetate and LLDPE for biorientation and high shrink values.

EXAMPLE 3

In this example, the aforedescribed inventive sample 1 was compared with EVOH-Nylon blend core layer films having 100% LLDPE first outer layer films of the 1-butene copolymer type. Sample 5, a film of 1.35 mils thickness, had a 20 wt. % Nylon 6,66–80 wt. % EVOH (32 wt. % ethylene) core layer, a 100% LLDPE first outer layer of the 1-butene copolymer type (Union Carbide Corporation product designation 7510) and a second outer layer identical to the first outer layer. Sample 6, a film of 2.45 mils thickness, had a 30 wt. % Nylon 6,66–70 wt. % EVOH (32 wt. % ethylene) core layer, a 100% LLDPE first outer layer of the aforementioned 1-butene copolymer type and a 100% ethylene vinyl acetate (12 wt. % vinyl acetate) second outer layer. Samples 5 and 6 were tested for optical properties, % shrink and modulus of elasticity, and the results are compared with sample 1 in table B.

TABLE B

| Film Sample No. | Haze % | Gloss (45°) % | % Shrink MD/TD | Secant Modulus PSI | Seal |
| --- | --- | --- | --- | --- | --- |
| 1 | 8.6 | 60 | 35/41 | 27 M | Good |
| 5 | 13 | 48 | 15/21 | 65 M | Good |
| 6 | — | — | 14/22 | — | Good |

Table B shows that the superior optical and high shrink values of this invention cannot be achieved with a three layer EVOH and Nylon blend type core layer, using a 100% LLDPE first outer layer of the 1-butene type.

EXAMPLE 4

In this example, the optical properties of sample 1 were compared with EVOH-Nylon blend core layer films having ethylene vinyl acetate-LLDPE (1-butene copolymer type) blends as the first outer layer. Sample 7, a film of 2.45 mils thickness, had a 80 wt. % EVOH (32 wt. % ethylene)-20 wt. % Nylon 6,66 blend core layer, 50 wt. % LLDPE (butene-1 copolymer)-50 wt. % ethylene vinyl acetate (12 wt. % vinyl acetate) first outer layer and 75 wt. % ethylene vinyl acetate (12 wt. % vinyl acetate)-25 wt. % ethylene vinyl acetate (4.5 wt. % vinyl acetate) second outer layer. Sample 8, a film of 2.6 mils, thickness, had the same core layer and first outer layer compositions as sample 7 and a 75 wt. % ethylene vinyl acetate (12 wt. % vinyl acetate)-25 wt. % very low density polyethylene (VLDPE with density of 0.906 and 0.8 melt index sold by Union Carbide Corporation with product designation DFPA-1137) second outer layer. The results of the tests are summarized in Table C.

TABLE C

| Film Sample No. | Haze % | Gloss (45°) % | Gel Level |
| --- | --- | --- | --- |
| 1 | 8.6 | 60 | Low |
| 7 | 28.7 | 44.4 | — |
| 8 | 21 | 46 | High |

Table C shows that the superior optical and low gel values of this invention cannot be achieved with a three layer EVOH and nylon blend type core layer using a 50 wt. % EVA-50 wt. % LLDPE (1-butene copolymer type) first outer layer.

EXAMPLE 5

In the example the optical, shrink and strength properties of sample 1 were compared with those of a similar three layer film sample 9 of 2.6 mils thickness, in which the core layer was identical but the first outer layer comprised 70 wt. % ethylene vinyl acetate (12 wt. % vinyl acetate) and 30 wt. % LLDPE (butene-1 copolymer, product designation 7028) compared to 80% EVA-20% LLDPE as in sample 1. The second outer layer of sample 9 comprised a blend of 90 wt. % ethylene vinyl acetate and 10 wt. % of the LLDPE product designation 7028, compared to 95 EVA-5% LLDPE as in sample 1. The data is summarized in Table D.

TABLE D

| Film Sample No. | Haze % | Gloss (45°) % | % Shrink MD/TD | Secant Modulus PSI |
| --- | --- | --- | --- | --- |
| 1 | 8.6 | 60 | 35/41 | 27 M |
| 9 | 12.5 | 53.8 | 30/35 | 35 M |

Table D shows that the optical properties are unsatisfactory (gloss below 60% and haze above 12%) when the LLDPE content of the first layer is above about 25 wt. %, eg. 30 wt. %. The higher EVA content of the second layer (10% vs. 5% in sample 1) is not believed to contribute to this difference.

EXAMPLE 6

Sample 1 was formed into a seamed tube with one end sealed. The resulting article was hand stuffed with chunked, sweet pickled ham, placed in a mold and cooked in hot water.

Another such article was hot water cooked without use of a mold. The heating regime was a hot water bath at 180° F. for five hours, then 190° F. until the internal temperature reached 155° F. The mean stuffed and cooked circumferences were 18.04 inches and 16.7 inches, respectively, and the cooking yield was 99.6%. The sample 1 article survived mold cooking without breakage or film delamination. This performance was similar to the aforementioned apparently six layer commercially employed film sold by W. R. Grace Company under the product designation CN-510, used as the control.

The sample 1 article cooked without a mold had seam splits and film delamination at the splits, but this was of no particular significance as a commercial enbodiment would probably be in the form of a seamless tube. Sample 1 was notably hazier and slightly less glossy than the control film when off the product, but this difference was less obvious on the cooked products and sample 1 was considered commercially acceptable.

A preferred embodiment of this invention is a three layer film having a core layer of between about 75 to 85 wt. % hydrolyzed ethylene-vinyl acetate copolymer containing between about 32 and 38 wt. % ethylene and blended with between about 15 and 25 wt. % Nylon 6,66. This core layer has an oxygen transmission rate below about 75 cc/m²/mil thickness/24 hrs./Atm and thickness of between about 0.05 and 0.2 mils. The first outer layer is of thickness between about 1.2 and 2.6 mils, directly adhered to one side of the core layer and comprises a blend of ethylene vinyl acetate containing between about 15 and 20 wt. % linear low density polyethylene being a copolymer of hexane-1 and ethylene. The second outer layer is of thickness between about 0.3 and 1.0, directly adhered to the other side of the core layer. It comprises a blend of ethylene-vinyl acetate containing between about 9 and 12 wt. % vinyl acetate, and up to about 5 wt. % linear low density polyethylene being a copolymer of butene-1 and ethylene. The film has a total thickness of between about 2.0 and 3.5 mils and is irradiated at a level of between about 2 anf 4 MR.

While the preferred embodiments of this invention have been disclosed hereinabove, those skilled in the art will appreciate that changes and modifications may be made therein without departing from the spirit and scope of the invention.

What is claimed is:

1. A three layer plastic film comprising:
   (a) a core layer of between about 60 and 90 wt. % hydrolyzed ethylene-vinyl acetate copolymer containing between about 28 and 40 wt. % ethylene and blended with between about 10 and 40 wt. % amide polymer having a melting point below about 420° F., said core layer providing an oxygen transmission rate through the film below about 90 cc/m²/mil thickness/24 hrs/Atm;
   (b) a first outer layer directly adhered to one side of said core layer comprising a blend of ethylene-vinyl acetate containing between about 7 and 15 wt. % vinyl acetate and between about 10 and 25 wt. % linear low density polyethylene being a copolymer of C6 to C8 olefin and ethylene; and
   (c) a second outer layer directly adhered to the other side of said core layer and comprising ethylene vinyl acetate containing between about 7 and 15 wt. % vinyl acetate;
   (d) said film having been irradiated at a level of between about 1 and 5 MR.

2. A film according to claim 1 wherein the second outer layer is a blend of said ethylene vinyl acetate and up to about 10 wt. % linear low density polyethylene being a copolymer of C6 to C8 olefin and ethylene.

3. A film according to claim 1 wherein said amide polymer in the core layer is a Nylon 6 copolymer.

4. A film according to claim 3 wherein said Nylon 6 copolymer is Nylon 6, 66.

5. A film according to claim 3 wherein said Nylon 6 copolymer is Nylon 6, 12.

6. A film according to claim 1 wherein the core layer comprises between about 25 and 85 wt. % hydrolyzed ethylene-vinyl acetate copolymer blended with between about 15 and 25 wt. % amide polymer.

7. A film according to claim 1 wherein said hydrolyzed ethylene-vinyl acetate copolymer contains between about 32 and 38 wt. % ethylene.

8. A film according to claim 1 wherein hexene-1 is the C6 to C8 olefin in said first outer layer.

9. A film according to claim 1 wherein the oxygen transmission rate of said core layer is below about 75 cc/M²/mil thickness/24 hrs/Atm.

10. A film according to claim 1 wherein the total thickness of the three layers is between about 2.0 and 3.5 mils.

11. A film according to claim 10 wherein the thickness of said core layer is up to about 0.3 mils.

12. A film according to claim 1 wherein the ethylene-vinyl acetate of said first outer layer contains between about 9 and 12 wt. % vinyl acetate.

13. A film according to claim 1 wherein said first outer layer contains between about 15 and 20 wt. % linear low density polyethylene.

14. A film according to claim 2 wherein hexene-1 is the C6 to C8 olefin in said second outer layer.

15. A film according to claim 10 wherein the thickness of said first outer layer is between about 1.2 and 2.6 mils.

16. A film according to claim 1 wherein said second outer layer is a blend of said ethylene-vinyl acetate and up to about 5 wt. % linear low density polyethylene being a copolymer of hexene-1 and ethylene.

17. A film according to claim 1 wherein the ethylene vinyl acetate of said second outer layer contains between about 9 and 12 wt. % vinyl acetate.

18. A film according to claim 10 wherein the thickness of said second outer layer is between about 0.3 and 1.0 mils.

19. A film according to claim 1 which is irradiated at a level of between about 2 and 4 MR.

20. A three layer plastic film comprising:
   (a) a core layer of between about 75 and 85 wt. % hydrolyzed ethylene-vinyl acetate copolymer containing between about 32 and 38 wt. % ethylene and blended with between about 15 and 25 wt. % Nylon 6,66 copolymer, said core layer having an oxygen transmission rate below about 75 cc/M²/mil thickness/24 hrs/Atm and thickness of between about 0.05 and 0.2 mils;
   (b) a first outer layer of thickness between about 1.2 and 2.6 mils directly adhered to one side of said core layer comprising a blend of ethylene vinyl acetate containing between about 9 and 12 wt. % vinyl acetate, and between about 15 and 20 wt. % linear low density polyethylene being a copolymer of hexene-1 and ethylene; and
   (c) a second outer layer of thickness between about 0.3 and 1.0 mils directly adhered to the other side of said core layer and comprising a blend of ethylene-vinyl acetate containing between about 9 and 12 wt. % vinyl acetate, and up to about 5 wt. % linear low density polyethylene being a copolymer of butene-1 and ethylene;
   (d) said film having a total thickness of between about 2.0 and 3.5 mils and having been irradiated at a level of between about 2 and 4 MR.

* * * * *